United States Patent
Keese et al.

(10) Patent No.: US 7,783,434 B2
(45) Date of Patent: Aug. 24, 2010

(54) MASS FLOW METER HAVING AN OSCILLATION SENSOR AND METHOD FOR ELIMINATING NOISE SIGNALS FROM THE MEASUREMENT SIGNAL

(75) Inventors: Dieter Keese, Wahlsburg (DE); Thomas Blume, Halle/Saale (DE)

(73) Assignee: ABB AG, Mannheim (DE)

( * ) Notice: Subject to any disclaimer, the term of this patent is extended or adjusted under 35 U.S.C. 154(b) by 416 days.

(21) Appl. No.: 11/790,427

(22) Filed: Apr. 25, 2007

(65) Prior Publication Data

US 2007/0255534 A1    Nov. 1, 2007

(30) Foreign Application Priority Data

Apr. 27, 2006    (DE) ........................ 10 2006 019 551

(51) Int. Cl.
*G01F 1/00*    (2006.01)
*G06F 19/00*    (2006.01)
*G06F 17/40*    (2006.01)

(52) U.S. Cl. ............................ 702/54; 73/592; 73/861; 73/861.18; 73/861.354; 73/861.355; 73/861.356; 702/45; 702/50; 702/189; 702/191; 708/300

(58) Field of Classification Search .................... 73/570, 73/584, 592, 649, 861, 861.18, 861.19, 861.351, 73/861.354, 861.355, 861.356; 702/1, 33, 702/45, 50, 55, 56, 127, 189, 190, 191, 193, 702/194, 195; 703/100, 200, 300

See application file for complete search history.

(56) References Cited

U.S. PATENT DOCUMENTS

| | | | |
|---|---|---|---|
| 4,252,028 A | 2/1981 | Smith et al. | |
| 5,555,190 A | 9/1996 | Derby et al. | |
| 5,734,112 A | 3/1998 | Bose et al. | |

FOREIGN PATENT DOCUMENTS

| | | |
|---|---|---|
| DE | 30 07 361 C3 | 9/1980 |
| DE | 696 07 756 T2 | 8/2000 |
| DE | 697 23 706 T2 | 6/2004 |
| EP | 1 249 689 A2 | 10/2002 |

*Primary Examiner*—Edward R Cosimano
(74) *Attorney, Agent, or Firm*—Buchanan Ingersoll & Rooney PC

(57) ABSTRACT

Mass flow meter having at least one measurement tube, through which mass flows, as an oscillation body which can be set in mechanical oscillation by means of an excitation unit, the oscillation behavior of which varying as a function of the mass flow can be recorded via at least one oscillation sensor in order to determine the mass flow, wherein in order to eliminate noise signals from the measurement voltage ($se_n$) recorded via the oscillation sensor computational technology means are provided for forming a complex conjugate spectrum ($|sa_{1j}|$) from the spectrum of the excitation voltage ($se_D$) as well as a vector product between this ($|sa_{1j}|$) and the measurement voltage ($se_n$) for the purpose of filtering, in order, by further computational technology means for inverse Fourier transformation, to obtain the signal relationship associated with the vector product between the excitation voltage ($se_D$) and the measurement voltage ($se_n$) so that the processed measurement voltage ($sa_1$) resulting therefrom then predominantly comprises a useful signal component.

14 Claims, 5 Drawing Sheets

Fourier Spectrum of the
Recorded Measurement Voltage $se_n$

MASS FLOW METER HAVING AN OSCILLATION SENSOR AND METHOD FOR ELIMINATING NOISE SIGNALS FROM THE MEASUREMENT SIGNAL

RELATED APPLICATIONS

This application claims priority under 35 U.S.C. §119 to German Application 10 2006 019 551.5 filed in Germany on Apr. 27, 2006, the entire contents of which are hereby incorporated by reference in their entireties.

TECHNICAL FIELD

The disclosure relates to a mass flow meter having at least one measurement tube, through which mass flows, as an oscillation body which can be set in mechanical oscillation by means of an excitation unit, the oscillation behavior of which varying as a function of the mass flow can be recorded via at least one oscillation sensor. The disclosure furthermore relates to a method for eliminating noise signals from the measurement signal obtained, to an electronic computation unit carrying out this signal processing as well as to a computer program product intended therefor.

A mass flow meter of the type in question here is used for the fluid mechanical flow measurement of fluid masses, and is used in systems in which the precision of the mass flow is relevant—for example in refineries.

BACKGROUND INFORMATION

DE 30 07 361 C3 of the species has already disclosed such a mass flow meter. The mass flow meter, which in this case has a symmetrical design, can consist of an influx flange and an efflux flange which form the connection between influx and efflux tube branches and external influx and efflux tubes. A measurement tube connects the influx and efflux tube branches so as to provide the mass flow meter with a shape like the Greek letter $\Omega$.

Embodiments with double parallel tube layouts are also widely known in the prior art. An influx acquisition point and an efflux acquisition point respectively lie at the connection sites. Each mass flow meter of the type in question here is based on the following physical principle:

An excitation unit sets the measurement tube in oscillation. The oscillations recorded at the influx and efflux acquisition points show the same phase. When flow takes place through the mass flow meter, the fluid mass experiences accelerated oscillation excursions, which generate a Coriolis force. The originally uniform oscillation of the tube then experiences effects due to the Coriolis force distributed along the measurement tube, which causes a phase shift at the influx and efflux acquisition points. The oscillation phases and oscillation amplitudes at the influx and efflux acquisition points are recorded by means of influx and efflux oscillation sensors, and are delivered to an electronic evaluation unit. The size of the phase shift is a measure of the mass flow.

By calibration, the way in which the phase shift correlates with the mass flow is established for each such Coriolis mass flow meter. These parameters are used for signal processing by the electronic evaluation unit. The signal processing of the measurement signal obtained by the oscillation sensor is made more difficult by the fact that considerable noise effects are superimposed on the usually very small measurement effect. The underlying noise signals may be many times greater than the useful signal component determined by the Coriolis effect.

SUMMARY

Noise signals are identified in the spectrum of the recorded measurement voltage, in order to effectively eliminate them by appropriate signal processing.

In respect of a suitable electronic computation unit for carrying out the method, the method as disclosed may be configured in the form of a computer program product.

In order to eliminate noise signals from the measurement voltage $se_n$ recorded via the oscillation sensor, first computational technology means are provided for forming a complex conjugate spectrum $|sa_{1,j}|$ from the spectrum of the excitation voltage $se_D$ as well as a vector product VP between this and the measurement voltage $se_n$ for the purpose of filtering, in order, by further second computational technology means for inverse Fourier transformation, to obtain the signal relationship associated with the vector product VP between the excitation voltage $se_D$ and the measurement voltage $se_n$ so that the processed measurement voltage $sa_1$ resulting therefrom then predominantly comprises a useful signal component.

The characteristic noise signals in the spectrum of the recorded measurement signal voltage can be fully eliminated owing to the special nature of the signal processing, so that the further signal processing with a view to obtaining a value of the mass flow leads to a reliable result. In the signal spectrum after the filtering, there is then only a similarity with the signal of the measurement voltage. The processed measurement signal, obtained by the inverse Fourier transformation as disclosed, contains the desired useful signal component. This type of special signal processing can be readily implemented in computation technology, e.g., by software using a computation unit, e.g., a personal computer. Practical tests have confirmed the high effectiveness of the noise signal elimination as disclosed.

The phase relation between the excitation voltage $se_D$ and the filtered measurement voltage $sa_1$ can be used in terms of signal processing technology as a measure of the flow value freed from the noise signal. The flow value can be readily determined from this difference in the phase relation.

Through further signal processing, the noise-free density of the medium to be measured can also be derived from the measurement voltage $sa_1$ processed as disclosed, by forming the frequency ratio between the excitation voltage $se_D$ and the filtered measurement voltage $sa_1$. This signal processing measure can also be readily implemented in computation technology (e.g. computational technology means as shown in the FIG. 7 example).

According to a further exemplary measure, third computational technology means, as shown in the FIG. 7 example, are provided for noise-free determination of the flow rate of the medium to be measured. The flow rate of the medium to be measured can be derived from the measurement signal processed as disclosed by using widely known mathematical relationships.

The excitation voltage $se_D$ driving the excitation unit for oscillatory excitation of the measurement tube can be sinusoidal and have a frequency in the range of from 50 Hz to 200 Hz, e.g., 100 Hz. This is because at 100 Hz, which is a relatively low frequency value, the noise signals to be eliminated in the Fourier spectrum of the signal of the measurement voltage can become easy to identify, for their identification and subsequent elimination. The Fourier spectrum of the excitation voltage can comprise a frequency which corresponds to the excitation voltage.

BRIEF DESCRIPTION OF THE DRAWINGS

Further exemplary measures which improve the invention will be presented in more detail below together with the description of exemplary embodiments.

DETAILED DESCRIPTION

Figure 1:
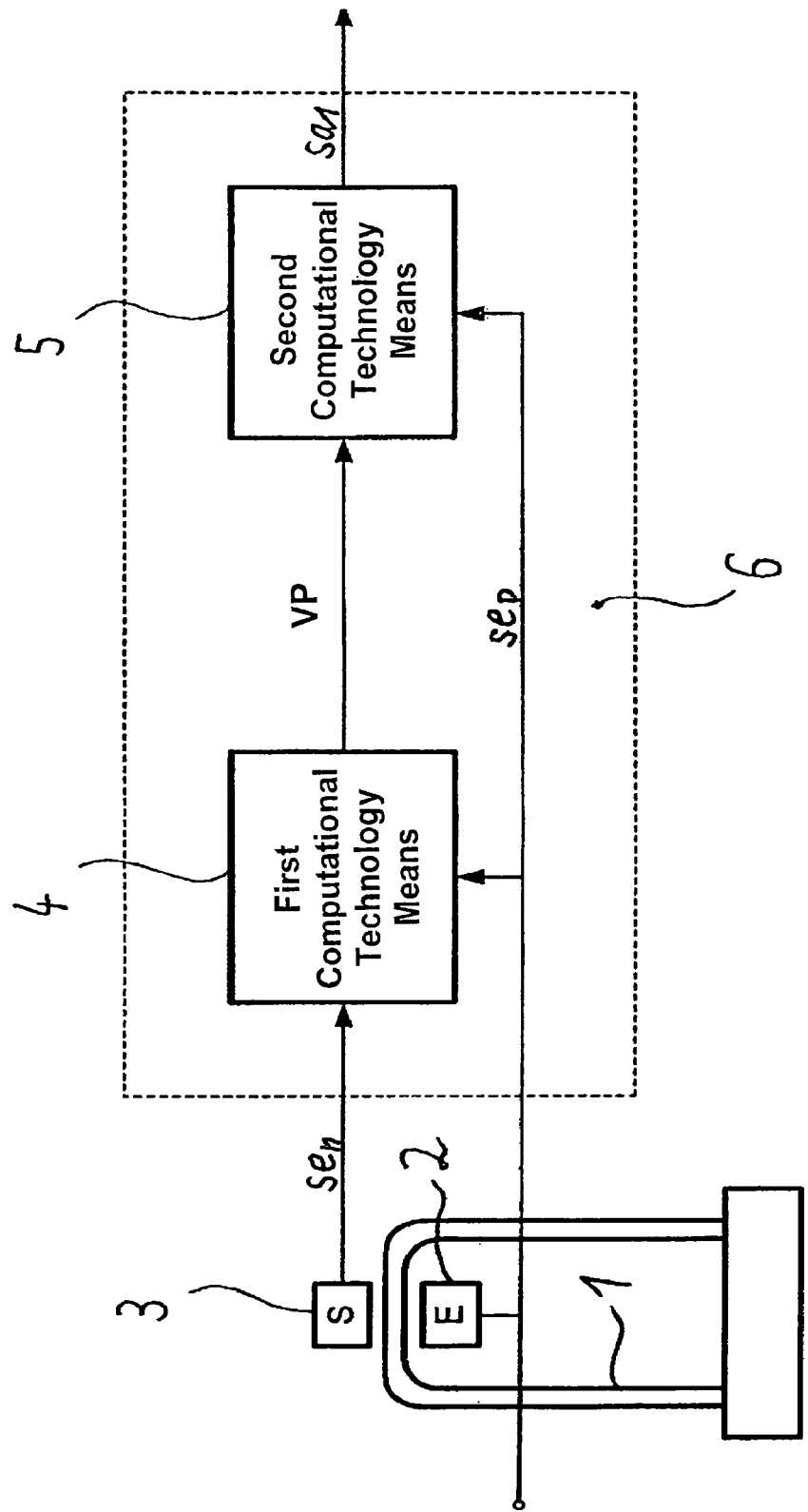
FIG. 1 shows a schematic block diagram of an exemplary mass flow meter having signal processing means.

According to FIG. 1, an exemplary mass flow meter comprises a measurement tube 1, through which a fluid medium to be measured flows. The measurement tube 1 is mounted so that it can oscillate, and it is set by means of an excitation unit 2 in mechanical oscillations which are influenced by the flow of substance to be measured. The measurement signal characterizing this influence is recorded via an oscillation sensor 3.

Figure 6:
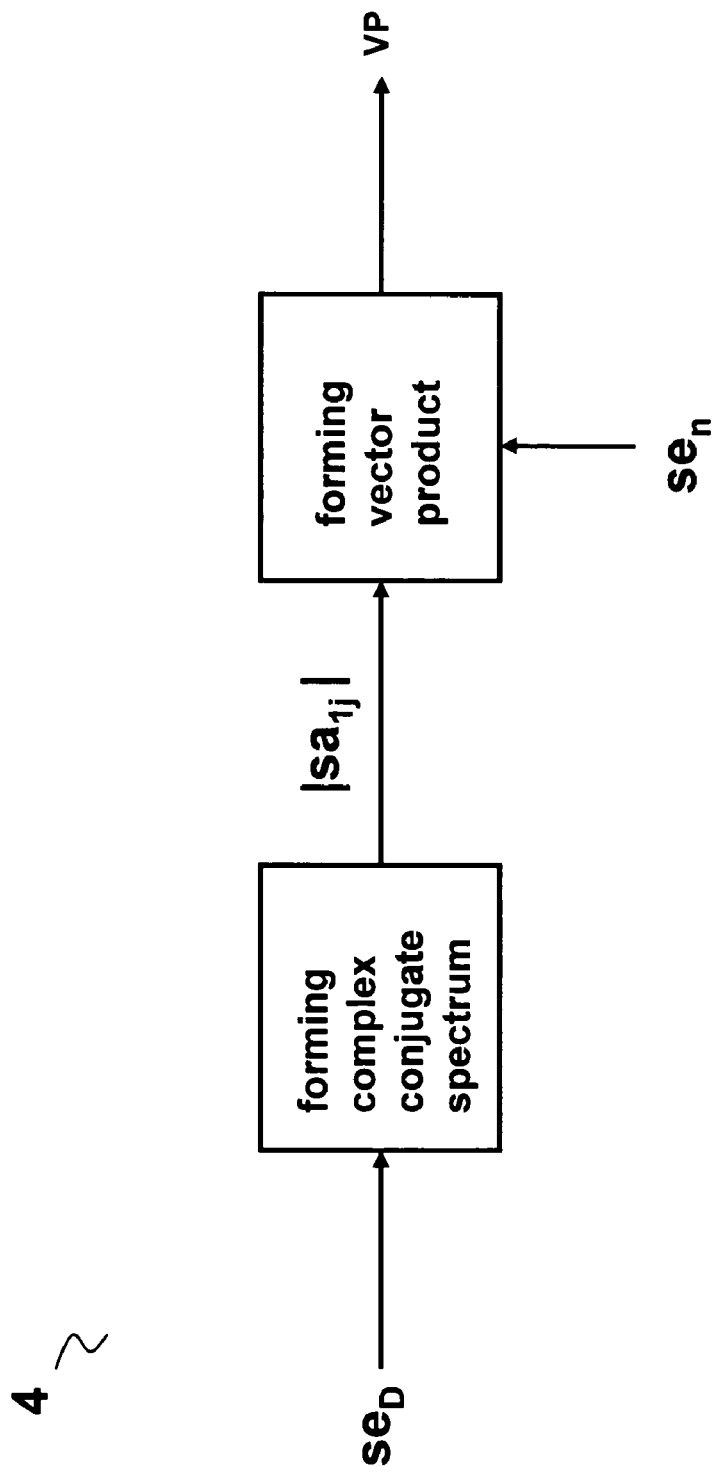
FIG. 6 shows an exemplary configuration of first computational technology means.

In order to eliminate noise signals from the measurement voltage $se_n$ recorded via the oscillation sensor 3, this voltage is first processed by first computational technology means 4 for forming a complex conjugate spectrum $|sa_{1j}|$ from the spectrum of the input excitation voltage $se_D$ as well as a vector product VP between $|sa_{1j}|$ and the measurement voltage $se_n$ for the purpose of filtering. An exemplary configuration of the first computational technology means 4 is shown in FIG. 6. Subsequent second computational technology means 5 are used for inverse Fourier transformation of the signal relationship associated with the vector product VP between the input excitation voltage $se_D$ and the measurement voltage $se_n$. The measurement voltage $sa_1$ resulting therefrom and available as output for further signal processing then predominantly contains a useful signal component.

Figure 7:
FIG. 7 shows an exemplary configuration of third computational technology means.

Desired measurement values can be obtained therefrom by further signal processing. For instance, the phase relation between the excitation voltage $se_D$ and the filtered measurement voltage $sa_1$ is to be regarded in terms of signal processing technology as a measure of the noise signal-free flow value, which can accordingly be determined and output by computational technology means as shown in FIG. 7.

The computational technology means 4 and 5 for carrying out the signal processing are arranged inside an electronic computation unit 6 which, in this exemplary embodiment, is part of a personal computer having a microcontroller and memory units. The method, on which the signal processing is based, is configured as software and stored in the electronic computation unit 6.

Figure 2:
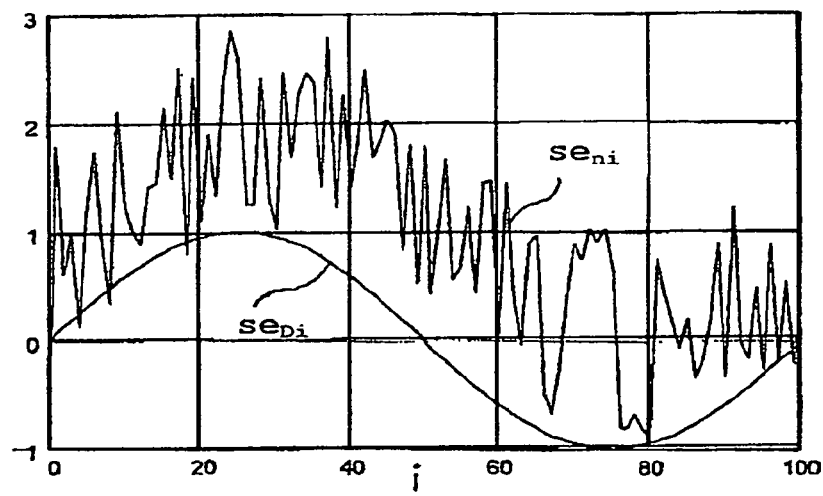
FIG. 2 shows a graphical representation of an exemplary signal spectrum in the initial situation.

In detail, the method on which the signal processing is based may be described as follows:

FIG. 2 shows an exemplary spectrum of the excitation voltage $se_D$, which is sinusoidal here, together with the measurement signal voltage $se_n$ recorded by the oscillation sensor. Although the reception signal can still be seen from the signal waveform of the measurement signal voltage $se_n$, noise signals are however very significantly superimposed on the useful signal per se.

Figure 3:
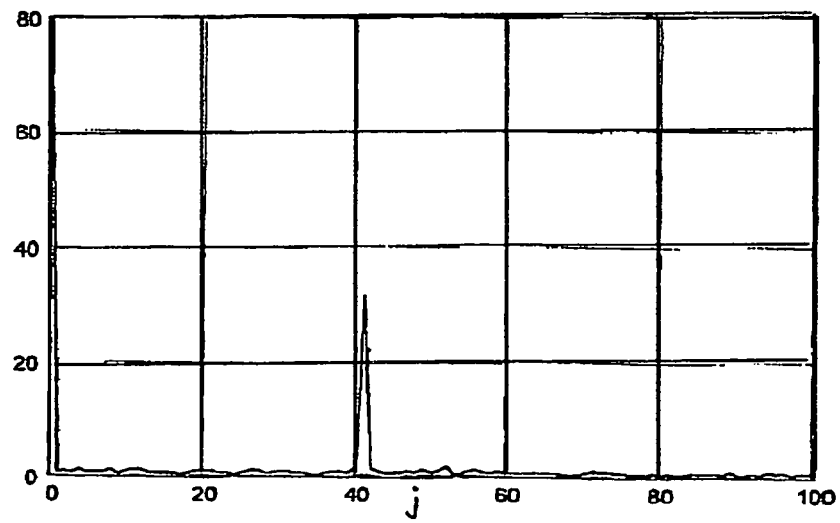
FIG. 3 shows a graphical representation of the exemplary signal spectrum after a first processing step.

Referring to FIG. 3, said noise signals impact on the Fourier spectrum of the recorded measurement voltage $se_n$, e.g., in the low frequency range. The Fourier spectrum of the excitation voltage $se_D$ has a signal with a frequency which corresponds to the excitation voltage, i.e. 100 Hz in this exemplary embodiment. The further signal processing for the purpose of noise signal elimination, or at least reduction, is based on initially forming a complex conjugate spectrum of the excitation voltage $se_D$.

Figure 4:
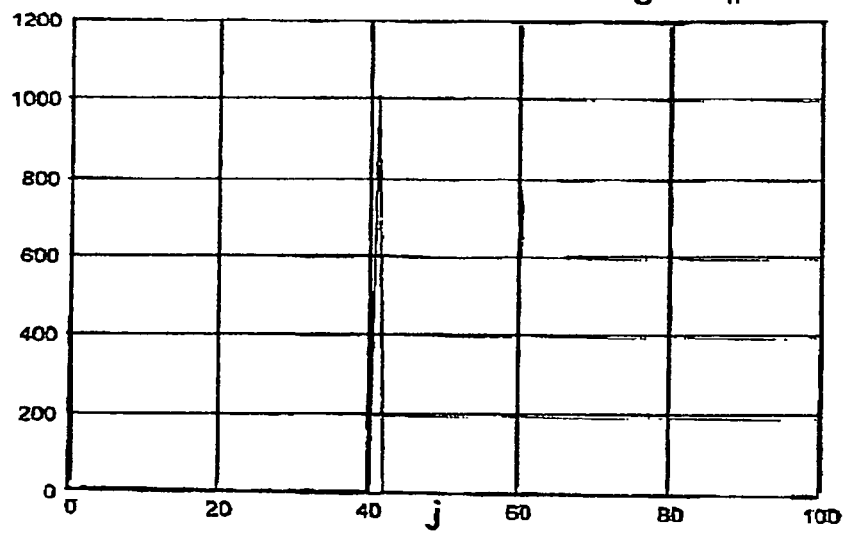
FIG. 4 shows a graphical representation of the exemplary signal spectrum after a further processing step.

According to FIG. 4, the vector product VP can be formed between the complex conjugate spectrum $|sa_{1j}|$ and the measurement voltage $se_n$. This signal processing step is used for filtering, and reflects the relationship between the excitation voltage $se_D$ and the measurement voltage $se_n$. In the spectrum after filtering, as can be seen, there is then only a similarity with the excitation voltage $se_D$.

Figure 5:
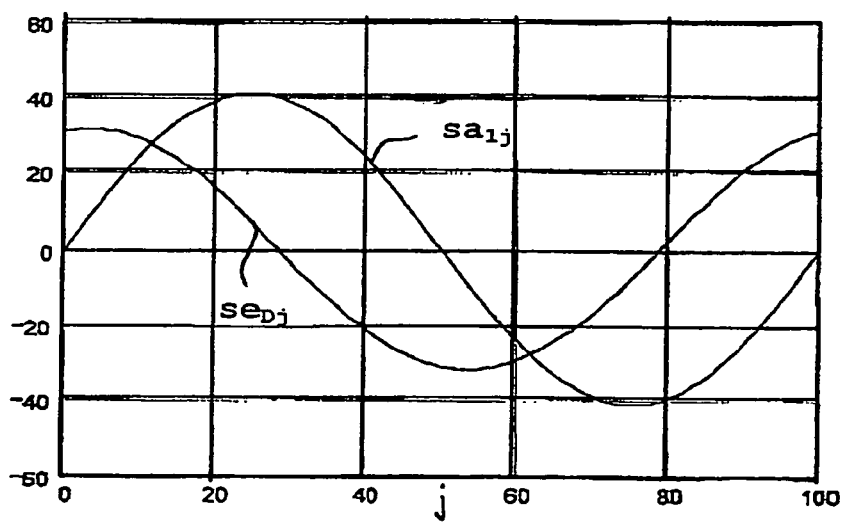
FIG. 5 shows a graphical representation of the exemplary signal spectrum in the final situation.

If an inverse Fourier transformation is subsequently carried out according to FIG. 5, the processed measurement voltage $sa_1$ resulting therefrom then predominantly contains a useful signal component and is phase-shifted relative to the excitation voltage $se_D$. The flow value is revealed by the phase shift between the two signals; the density of the medium is revealed by the frequency.

The invention is not restricted to the exemplary embodiment described above. Variants thereof, which are covered by the protective scope of the appended claims, are furthermore conceivable. For instance, relationships with the flow rate and the density of the medium may be established noise-free by further signal processing steps. Furthermore, the excitation voltage $se_D$ is not restricted to a sinusoidal signal waveform, since the nature of the excitation is of secondary importance in respect of the solution according to the invention. Although a unequivocal signal processing result can be obtained with a frequency of 100 Hz for the excitation voltage, other frequency values in the low frequency range are nevertheless also suitable.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCES

1 measurement tube
2 excitation unit
3 oscillation sensor
4 first computational technology means
5 second computational technology means
6 electronic computation unit
$se_D$ excitation voltage
$se_n$ recorded measurement voltage
$sa_1$ processed measurement voltage (also known as filtered measurement voltage)
$|sa_{1j}|$ complex conjugate spectrum

What is claimed is:

1. A mass flow meter, comprising:
    at least one measurement tube configured to allow a mass to flow therethrough and configured as an oscillation body having an oscillation behavior that is variable as a function of the mass flow, the oscillation body being configured to be set in mechanical oscillation by means of an excitation unit that is driven by an excitation voltage;

at least one oscillation sensor configured to record a measurement voltage based on the oscillation behavior of the oscillation body to determine the mass flow;

first computational technology means for
  forming a complex conjugate spectrum from a spectrum of the excitation voltage, and
  forming a vector product between the complex conjugate spectrum and the measurement voltage, the vector product reflecting a signal relationship between the excitation voltage and the measurement voltage; and second computational technology means for producing a processed measurement voltage based on an inverse Fourier transformation associated with the vector product so that the processed measurement voltage contains a useful signal component corresponding to a noise-filtered version of the measurement voltage.

2. The mass flow meter as claimed in claim 1, comprising third computational technology means for determining the rate of the mass flow through the measurement tube based on a phase relation between the excitation voltage and the processed measurement voltage.

3. The mass flow meter as claimed in claim 1, comprising third technology means for determining a density of the mass based on a frequency ratio between the excitation voltage and the processed measurement voltage.

4. The mass flow meter as claimed in claim 3, wherein the third computational technology means are configured to determine a rate of the mass flow through the measurement tube based on the processed measurement voltage.

5. The mass flow meter as claimed in claim 1, comprising third computational technology means for determining a rate of the mass flow through the measurement tube based on the processed measurement voltage.

6. The mass flow meter as claimed in claim 5, wherein the excitation voltage is sinusoidal.

7. The mass flow meter as claimed in claim 1, wherein the excitation voltage driving the excitation unit is sinusoidal.

8. The mass flow meter as claimed in claim 7, wherein the excitation voltage driving the excitation unit has a frequency in the range from 50 Hz to 200 Hz.

9. The mass flow meter as claimed in claim 8, wherein the excitation voltage driving the excitation unit has a frequency of about 100 Hz.

10. A method for eliminating noise signals from the measurement voltage of an oscillation sensor of a flow meter, the method comprising the computation steps of:
  forming a complex conjugate spectrum from the spectrum of an excitation voltage, the excitation voltage driving oscillatory excitation of a measurement tube of the flow meter,
  forming a vector product between the complex conjugate spectrum and the measurement voltage for the measurement voltage, and
  carrying out an inverse Fourier transformation associated with the vector product to evaluate a signal relationship between the excitation voltage and the measurement voltage, the inverse Fourier transformation producing a processed measurement voltage that contains a useful signal component corresponding to a noise-filtered version of the measurement voltage.

11. An electronic computation unit configured to process a measurement signal obtained via an oscillation sensor of a flow meter, comprising a computation unit configured to:
  form a complex conjugate spectrum from the spectrum of an excitation voltage, the excitation voltage driving oscillatory excitation of a measurement tube of the flow meter,
  form a vector product between the complex conjugate spectrum and the measurement voltage for filtering the measurement voltage, and
  carry out an inverse Fourier transformation associated with the vector product to evaluate a signal relationship between the excitation voltage and the measurement voltage, the inverse Fourier transformation producing a processed measurement voltage that contains a useful signal component corresponding to a noise-filtered version of the measurement voltage.

12. The electronic computation unit as claimed in claim 11, wherein the computation unit comprises at least one microcontroller having at least one assigned memory unit.

13. A computer readable storage medium having a computer program recorded thereon that causes an electronic computation unit to process a measurement signal obtained via an oscillation sensor of a flow meter, the program causing the electronic computation unit to perform operations comprising:
  forming a complex conjugate spectrum from the spectrum of an excitation voltage, the excitation voltage driving oscillatory excitation of a measurement tube of the flow meter,
  forming a vector product between the complex conjugate spectrum and the measurement voltage for filtering the measurement voltage, and
  carrying out an inverse Fourier transformation associated with the vector product to evaluate a signal relationship between the excitation voltage and the measurement voltage, the inverse Fourier transformation producing a processed measurement voltage that contains a useful signal component corresponding to a noise-filtered version of the measurement voltage.

14. A mass flow meter comprising:
  at least one measurement tube configured to allow a mass to flow therethrough and configured as an oscillation body having an oscillation behavior that is variable as a function of the mass flow;
  an excitation unit configured to set the oscillation body in mechanical oscillation based on an excitation voltage;
  at least one oscillation sensor configured to record a measurement voltage based on the oscillation behavior of the mass flow; and
  a computational technology unit configured to process the measurement voltage to
    form a complex conjugate spectrum from a spectrum of an excitation voltage, and
    form a vector product between the complex conjugate spectrum and the measurement voltage for filtering, to obtain a signal relationship, associated with the vector product, between the excitation voltage and the measurement voltage so that a processed measurement voltage can be determined that contains a useful signal component corresponding to a noise-filtered version of the measurement voltage.

* * * * *